United States Patent [19]

Lillie

[11] 4,441,162

[45] Apr. 3, 1984

[54] LOCAL NETWORK INTERFACE WITH CONTROL PROCESSOR & DMA CONTROLLER FOR COUPLING DATA PROCESSING STATIONS TO COMMON SERIAL COMMUNICATIONS MEDIUM

[75] Inventor: Terrance L. Lillie, Palo Alto, Calif.

[73] Assignee: Pitney Bowes Inc., Stamford, Conn.

[21] Appl. No.: 256,332

[22] Filed: Apr. 22, 1981

[51] Int. Cl.³ .............. G06F 15/16; G06F 3/04
[52] U.S. Cl. .................. 364/900; 370/85; 370/92
[58] Field of Search ... 364/200 MS File, 900 MS File; 370/92–94, 86–88, 85; 375/107; 340/825.5, 825.51

[56] References Cited

U.S. PATENT DOCUMENTS

| | | | |
|---|---|---|---|
| 3,890,471 | 6/1975 | Hachenburg | 370/88 |
| 4,063,220 | 12/1977 | Metcalfe et al. | |
| 4,190,821 | 2/1980 | Woodward | 340/147 SC |
| 4,205,326 | 5/1980 | Porter et al. | 340/147 R |
| 4,215,400 | 7/1980 | Denko | 364/200 |
| 4,228,495 | 10/1980 | Bernhard et al. | 364/101 |
| 4,271,505 | 6/1981 | Menot et al. | 370/85 |
| 4,271,507 | 6/1981 | Gable et al. | 370/94 |
| 4,287,592 | 9/1981 | Paulish et al. | 370/88 |
| 4,292,197 | 7/1983 | Couper et al. | 364/200 |
| 4,296,466 | 10/1981 | Guyer et al. | 364/200 |
| 4,319,338 | 3/1982 | Grudowski et al. | 364/900 |
| 4,332,027 | 5/1982 | Malcolm et al. | 370/94 |
| 4,334,306 | 6/1982 | Ulug | 370/94 |
| 4,347,498 | 8/1982 | Lee et al. | 340/825.02 |
| 4,373,183 | 2/1983 | Means et al. | 364/200 |
| 4,385,382 | 5/1983 | Goss et al. | 370/96 |
| 4,387,441 | 6/1983 | Kocol et al. | 364/200 |
| 4,394,726 | 7/1983 | Kohl | 364/200 |

OTHER PUBLICATIONS

C. Bass et al., *Local Network Gives New Flexibility to Distributed Processing*, Electronics International (25 Sep. 1980) vol. 53, No. 21, pp. 114–122.

R. Carpenter et al., *A Micro-Processor-Based Local Network Node*, IEEE Proceedings Computer Communications Networks Compcon (5th–8th Sep. 1978), pp. 114–122.

*Primary Examiner*—James D. Thomas
*Assistant Examiner*—Archie E. Williams, Jr.
*Attorney, Agent, or Firm*—Robert H. Whisker; David E. Pitchenik; William D. Soltow, Jr.

[57] ABSTRACT

A local network interface is used in a network for enabling each of a plurality of data processing stations to communicate with one another via a communications medium. The local network interface is connected between the communications medium and the data processing stations. The local network interface includes a processor, a direct memory access (DMA) controller connected to the processor, means for controlling communications connected between the communications medium and the processor, and memory means which is connected to the processor, to the means for controlling communications, and to the DMA controller. Data residing in the memory means may be accessed for transmission to, and may be updated from, the communications medium via the local network interface.

7 Claims, 3 Drawing Figures

LOCAL NETWORK INTERFACE WITH CONTROL PROCESSOR & DMA CONTROLLER FOR COUPLING DATA PROCESSING STATIONS TO COMMON SERIAL COMMUNICATIONS MEDIUM

BACKGROUND OF THE INVENTION

1. Field of the Invention

The present invention relates to network communication systems and more particularly, to local network interface systems for use in a word processing system.

2. Description of the Prior Art

To allow two or more so-called intelligent terminals to communicate with each other, various communication systems, called networks, have been developed. These networks allow terminals, work stations, or data processing stations to share each other's resources when required. A common communication medium is usually employed over which data can be transferred among the stations.

The communication medium most commonly employed is a coaxial cable, along which a plurality of taps are located. Stations can be connected directly to the coaxial cable via the taps, or stations can be connected to each other via a nodal point or node, which in turn is connected to the coaxial cable via a tap. The tap allows the node to broadcast data to and receive data from all other nodes or to and from individually connected stations on the communication network. Any station on the network may initiate a transmission of data on a free channel of the communication medium.

In many systems, nodes are devices specially designed to transfer data between two data processing stations, between two communications channels or between two branches or segments of a communications channel. Often these nodes are complex special purpose devices, not required for any function other than for transferring information, which tend to make the communications system or network complicated.

Another problem heretofore inherent in networks having separate intelligent data processing stations connected to each other via a communications medium is data handling and the supervision thereof. In many previous systems, a processor, CPU or microprocessor included in each data processing station controls data transfer between its associated station and the communications channel to which it is connected. The supervision of this data transfer function can be time consuming for a processor whose time should be better spent performing other tasks. A system in which a great amount of data is transferred among a number of stations at relatively high speed requires an appreciable amount of processor supervision in the aforementioned systems. Clearly, the greater the amount of data transfer, the more processor time must be consumed in performing this function.

SUMMARY OF THE INVENTION

The present invention is intended to simplify network components by allowing any one of a plurality of data processing stations to function both as an independent work station and as a nodal point for the network between two branches of the communication medium.

The present invention also eliminates the requirements for specialized components to function as nodal points for the network.

The subject invention achieves the above objects and overcomes the disadvantages of the prior art by means of a local network interface for connecting a common serial communications medium to a data processing station, the station including at least one station processor, which comprises; a communications control apparatus for monitoring and formatting the flow of data to and from the interface; a bufer memory for storing data upon receipt from the medium and for storing data to be transmitted to the medium; a direct memory access (DMA) controller operatively connected to the communications control apparatus and to the buffer memory for controlling the flow of data between the communications control apparatus and the buffer memory; a control processor operatively connected to the communications control apparatus, the DMA controller and the buffer memory to control the operation of the interface and an interprocessor communications apparatus for transferring data between the buffer memory and the data processing station. To receive data the control processor initializes the communications control means to receive data, the communications control means signals the control processor upon detection of a message intended for the interface, the control processor initializes the DMA controller, the message is received and is formatted by the communications control apparatus and transferred to the buffer memory by said DMA controller and the control processor signals the station processor and said message is transferred to the data processing station by the interprocessor communications means. To transmit data the station processor signals the control processor and a message is transferred to the buffer memory by the interprocessor communications apparatus, the DMA controller is initialized by the control processor and the communications control apparatus is initialized by said control processor to transmit data, when the medium is free the message is transmitted from the buffer memory to the communications control apparatus by the DMA controller and the data is reformatted and transmitted by said communications control apparatus.

In another embodiment the subject invention comprises an interface as described above wherein the communications control apparatus further comprises a transmitter state control apparatus operatively connected to the control processor for receiving initialization commands from the control processor and initializing the communications control apparatus to receive or transmit data in accordance with the initialization commands and for controlling the communications control apparatus in accordance with the appropriate communications medium protocol during transmission of data, whereby the processing burden on the control processor is reduced during data transmission.

Other objects and advantages of the subject invention will be readily apparent to those skilled in the art from consideration of the detailed description set forth below and of the attached drawings.

DETAILED DESCRIPTION OF THE PREFERRED EMBODIMENT

The local network interface of the present invention provides a means for attaching two or more word or data processors to a common network so that resources may be shared within the network. Such shared resources can be common disk storage, for example, or common printers. As many as 32 data processing stations or more can be attached to a common co-axial cable which can be up to one mile in length. Transmission rates in such a network system are on the order of one megahertz.

Figure 1:
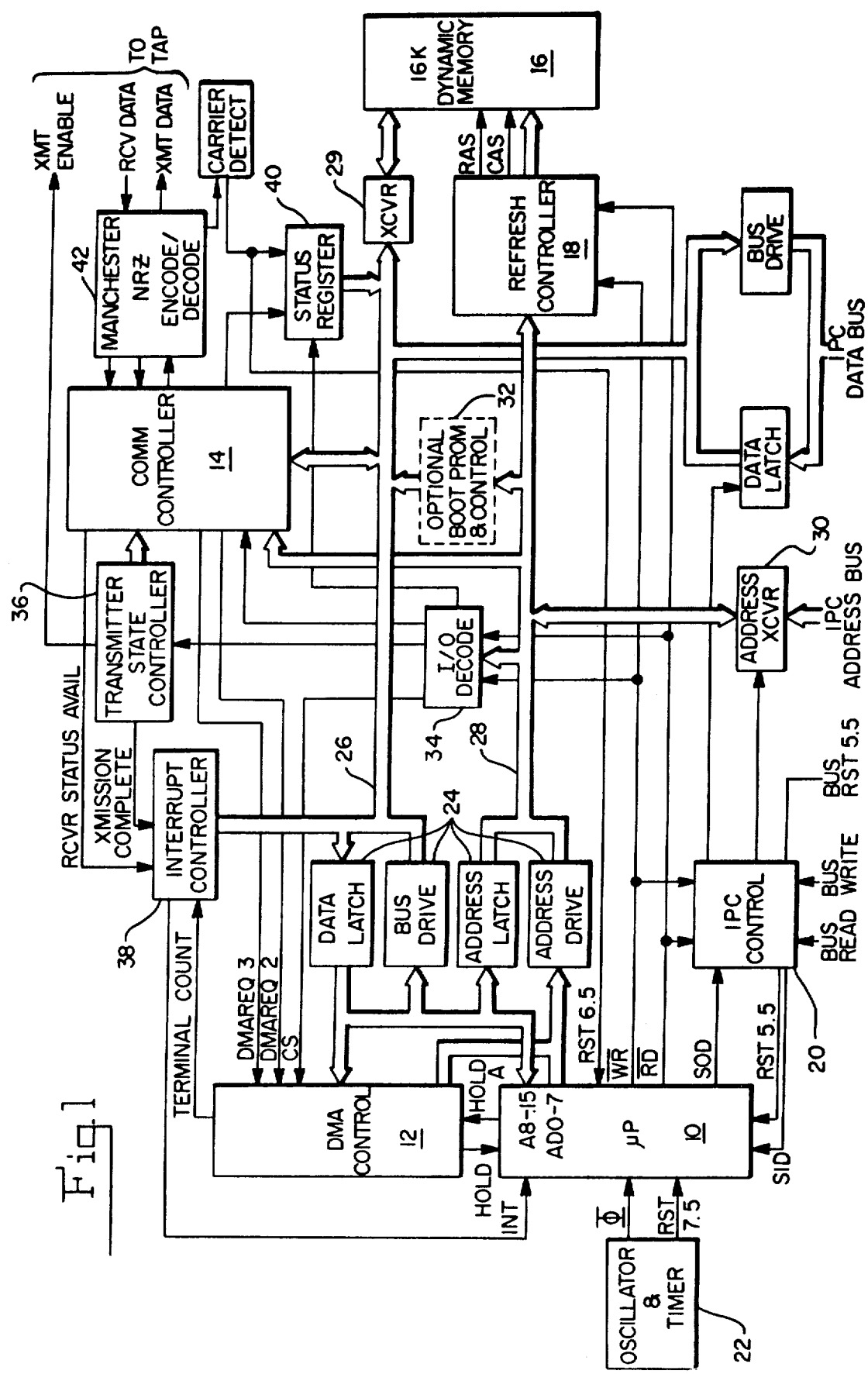
FIG. 1 is a schematic block diagram in accordance with the present invention.

Referring now to FIG. 1, the local network interface consists of an Intel Corp. model number 8085 microprocessor 10, a model number 8237-5 direct memory access (DMA) controller, a Signetics Corp. model number 2652 communications controller 14 and at least 16K bytes of dynamic memory 16 which is refreshed by an Intel Corp. model number 8202A dynamic memory controller 18. The local network interface in this embodiment also includes an interprocessor communications (IPC) interface or controller 20 to allow the network to be attached to other processors in the system. The use of such an IPC controller 20 is described in detail in copending U.S. patent application Ser. No. 177,319, filed Aug. 12, 1980, for "Communications Systems for a Word Processing System Employing Distributed Processing Circuitry".

An oscillator and timer 22 is connected to the processor 10 via lines which provide a timing signal called phi (Φ) and a RESTART (RST) 7.5 signal used for timing out the processor 10 communications operations. The IPC controller 20 is connected to both the processor 10 and the refresh memory controller 18 via read (RD) and write (WR) lines. The IPC controller 20 is also connected to the processor 10 via input and output lines (SID and SOD respectively) and by a RESTART (RST) 5.5 line. The IPC controller 20 communicates with other processors on the network over a bus, not shown.

Data and address latches shown generally at reference numeral 24 are connected between the DMA controller 12 and processor 10 and the internal data and address buses 26 and 28 respectively. The internal data bus 26 interconnects the communications controller 14 with the memory 16 via a transceiver 29 and is also connected to an IPC data bus, not shown. Similarly, the internal address bus 28 interconnects the communications controller 14 with the refresh memory controller 18 and is also connected to an IPC address bus, not shown, via an address transceiver 30.

A boot PROM and associated logic 32 is optionally connected between the internal address and data buses 28 and 26, respectively.

An input/output (I/O) decoder 34 is connected to the internal address bus 28 and the communications controller 14. The I/O decoder 34 also interconnects a transmitter state controller 36 which controls data communications of the communications controller 14, and an interrupt controller 38 which is directly connected to the internal data bus 26 and processor 10 via its interrupt (INT) line.

Also connected to the internal data bus 26 is a status register 40 which receives input signals from the I/O decoder 34 and the communications controller 14. A CARRIER DETECT signal may also be supplied to the status register 40. The status register 40 is adapted to send a signal to the processor 10 over a RESTART (RST) 6.5 line to indicate the status of the communications cable, as hereinafter described.

A data encoder/decoder is provided at reference numeral 42 to convert data from the communications controller 14 into Manchester non-return-to-zero (NRZ) format for transmission over the communications cable. The Manchester code is a bi-phase code described in detail in "Encoding Schemes Support High Density Digital Data Recording", by R. Severt published in "Computer Design" May 1980.

The local network interface is located on a single printed circuit board positioned within a housing 50 or floor module 60 shown and described, for example, in copending U.S. patent application Ser. No. 177,531, filed Aug. 12, 1980, for "Word Processing System Employing a Plurality of General Purpose Processor Circuits". The interface allows the above-identified local system to communicate with the network. Unlike other network communication systems, the present invention requires no complex circuitry for data collision detection as is explained in detail hereinafter.

Figure 2:
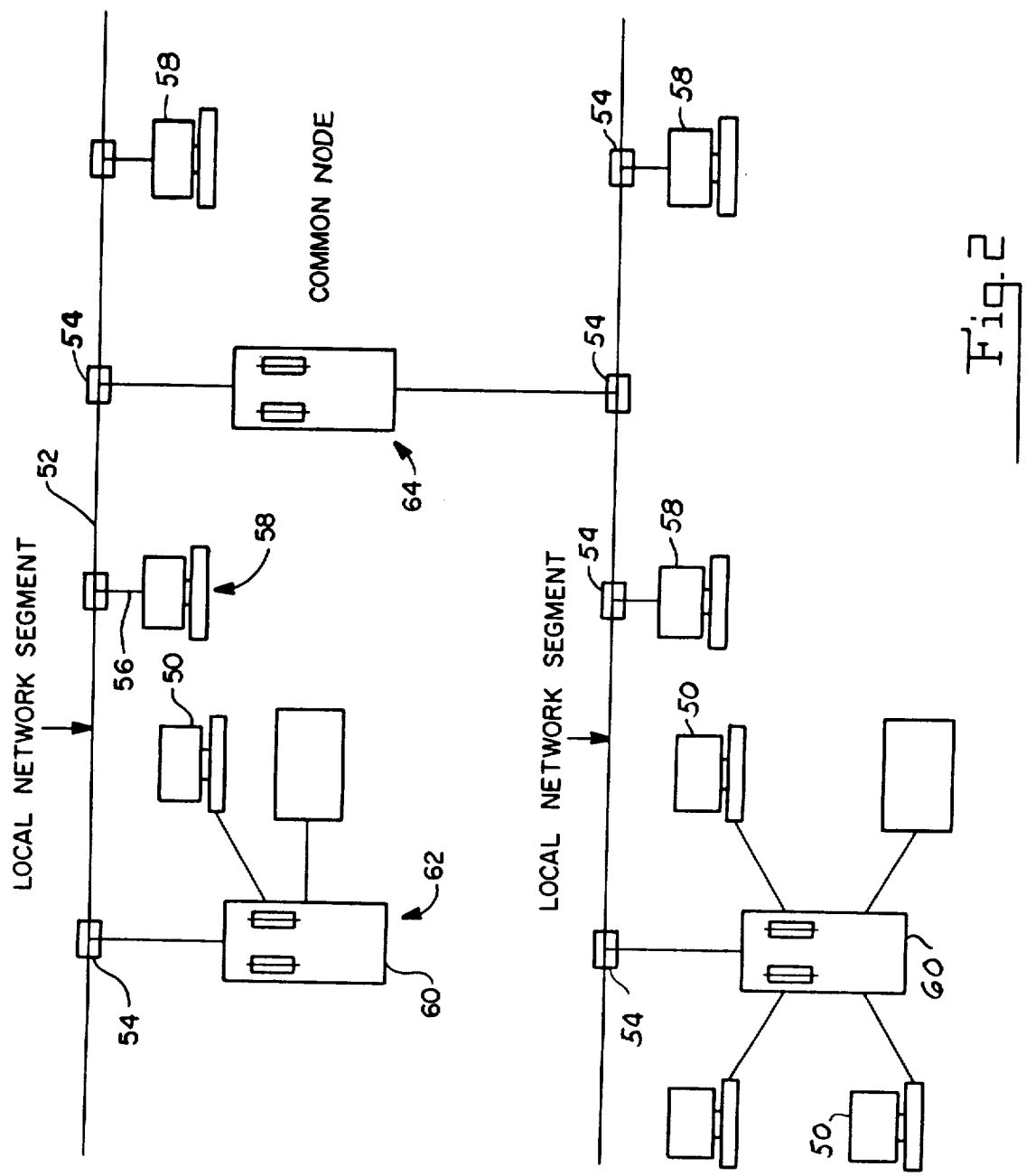
FIG. 2 is a block diagram of one embodiment of the configuration of a network.

Referring now to FIG. 2, individual data processing stations 50 can be attached to the communications co-axial cable or channel 52 by means of a tap 54. The tap only slightly affects the cable 52. Accordingly, the transmission characteristics of the cable 52 are not significantly disturbed. The tap 54 can be located up to 200 feet from its corresponding station 50. Normally the cable 52 is laid out in a substantially straight line in the ceiling or the floor of a building and users attach their stations 50 to the cable 52 with line lengths 56 of up to 200 feet. The line 56 includes the following signal lines: transmit enable (XMT ENABLE), receive data (RCV DATA) and transmit data (XMT DATA).

The configuration of data processing stations 50 on the network can take a variety of forms. A station 50 can be directly connected to the communications cable 52 via a tap 54, as shown generally at reference numeral 58. A number of work stations 50 can also be connected to a floor module 60 subsystem or cluster, as shown generally at reference numeral 62, which in turn is connected via a tap 54 to the cable 52. Moreover, two local network segments can be interconnected by means of a floor module 60 acting as a nodal point, as shown generally at reference numeral 64. No special modification to the local network interface is required to adapt a floor module 60 containing a local network interface for use as a nodal point. It should be appreciated that the aforementioned three configuration elements provide unlimited flexibility in arranging data processing stations 50 on the network and that the present disclosure is not intended to be limited to the configuration shown and described in FIG. 2.

Referring also to FIG. 1, the local network interface functions as follows. Information from the communications channel 52 (the co-axial cable) is transferred via the tap 54 to the local network residing in the data processing station 50 or floor module 60.

Information on the communications channel 52 is encoded by the encoder/decoder 42 using a Manchester code, as described, for example, in the aforementioned "Computer Design" article, which carries both clock and data information. Information from the communications controller 14 is in a non-return-to-zero (NRZ) code format. Information to or from the tap 54 must therefore pass through the Manchester (NRZ) encoder/decoder 42 to change the format of the data. Use of the Manchester code simplifies data recovery logic. The Manchester code carries clock information for every bit cell. Accordingly, the data recovery scheme used to convert this data to a usable form for the communications controller 14 is greatly simplified.

Data from the communications channel 52 is separated at the tap 54. A common communications channel 52 is used for both transmit and receive operations, and the tap 54 provides both receive data (RCV DATA) and transmit data (XMT DATA) lines to the local network interface. Information from the tap 54 enters via the receive data line and passes through the Manchester decoder 42. This information is converted into a non-return-to-zero coding format. It enters the communications controller 14 and is converted from a serial form to a parallel form usuable by the remainder of the system.

The communications controller 14 formats data required for a protocol known as synchronous data link control (SDLC). The beginning of a transmission is signalled by a leading flag, followed by a terminal address byte, followed by data information. The communications controller 14 monitors the incoming data stream for an address which matches the address of the local terminal. The communications controller 14 interrupts the processor 10 only when an address match occurs. Accordingly, the throughput of the local processor is not compromised. The local processor 10 is not constantly interrupted to analyze the incoming data stream to determine whether the data is intended for the local station 50.

Once an incoming data stream intended for the local station 50 has been detected, a DMA process occurs under control of the DMA controller 12 to transfer information from the communications controller 14 into local memory 16. The processor 10 is then signalled by a XMISSION COMPLETE signal at the end of the receive data stream. It is interrupted by the communications controller 14 via the interrupt controller 38 to indicate the end of the transmission. The processor 10 can then access the data in its memory 16, analyze the incoming data stream, and react accordingly.

Information that is intended for other processors in the system is then passed over the IPC bus via the IPC interface 20 in a fashion similar to that employed by the system described in copending application Ser. No. 177,319, as hereinabove referenced.

For informantion that is to be transmitted, data is first retrieved across the IPC bus via the IPC interface 20 and placed into local memory 16. The local network processor 10 then formats the data by storing it in a transmit buffer which resides within the local 16K memory 16. The data is preceded in the transmit buffer by the address of the station 50 to which the transmission is directed. When the data is formatted or blocked within the memory 16, the processor 10 initializes the DMA controller 12 to point to the first location of the transmit buffer. The DMA controller 12 is also loaded with byte code information to indicate how many bytes are in the present transmission packet.

Once that initialization has been completed, the processor 10 performs an output instruction to the transmitter state controller 36. The transmitter state controller 36 then assumes control of the communications controller 14 and begins a transmission of data onto the network. Transmission begins with a series of opening flags, and then data from the transmit buffer is transferred to the communications controller 14 one byte at a time on a DMA basis. The first byte consists of the destination address for the transmission followed by the data block. Data is passed from the communications controller 14 through the Manchester encoder 42 and to the tap 54 via the transmit data (XMT DATA) line 56.

Information is transferred across the communications channel 52 in packets. A packet consists of one or two opening flags, a destination address, and at least 256 bytes of data in a block. At the end of the block of data, there are provided two frame check sequence characters used to perform an error check on the data block. A series of closing flags are then provided to indicate the end of the frame.

The local network interface also includes provisions for an optional boot PROM 32. If the local network interface is used in a remote application without disk storage, program information for the station 50 can be loaded through the communications network (i.e., the internal data and address buses 26 and 28, respectively). The optional boot PROM 32 functions in a similar manner to the boot operation on the floppy disk controller described in the system disclosed in copending U.S. patent application Ser. No. 177,319, filed Aug. 12, 1980, as herein referenced above. When power is applied to the unit, the boot PROM 32 exists in the memory 16 from address 0 to 400 hex, and the processor 10 begins executing instructions from the boot PROM 32.

As information is transferred across the local network, it is transferred under control of the program within the boot PROM 32 into main memory 16. The boot PROM 32 is actually a phantom PROM in that although it occupies memory address space from 0 to 400 hex, information from the communications channel 52 can be written into those locations if write operations are performed into the memory 16. Once the boot operation is complete, the boot PROM 32 is ignored by the system, and the entire memory space is occupied by the RAM memory 16 on the board.

The local network interface includes an interrupt controller 38 to generate interrupts to the processor 10. The interrupt structure for the processor 10 utilizes the model 8085 microprocessor special RESTARTS 5.5, 6.5 and 7.5 as well as the TRAP interrupt. The TRAP interrupt is assigned to the communications controller 14. Whenever a receiver or a transmitter completes an operation, it signals the processor 10 by activating the TRAP line. TRAP is a non-maskable interrupt.

When the local network interface is a slave across the IPC channel, the master processor in the system can signal the local network interface processor 10 by activating the RESTART 5.5 line. This function is described in greater detail in co-pending U.S. patent application Ser. No. 177,319, as hereinabove referenced.

The RESTART 6.5 line is tied to the CARRIER DETECT signal. If the state of the CARRIER DETECT signal changes, the local network interface processor 10 can be signaled. That is a maskable interrupt. The local network interface processor 10 can therefore decide whether to examine that line.

The RESTART 7.5 line is assigned to a timer 22. It is therefore possible to time out communications operations on the communications channel 52. The local network interface originates a transmission and expects an acknowledgement signal from its intended receiver within a certain amount of time. If it does not receive an acknowledgement, it can be assumed that the transmission has not been correctly received.

Figure 3:
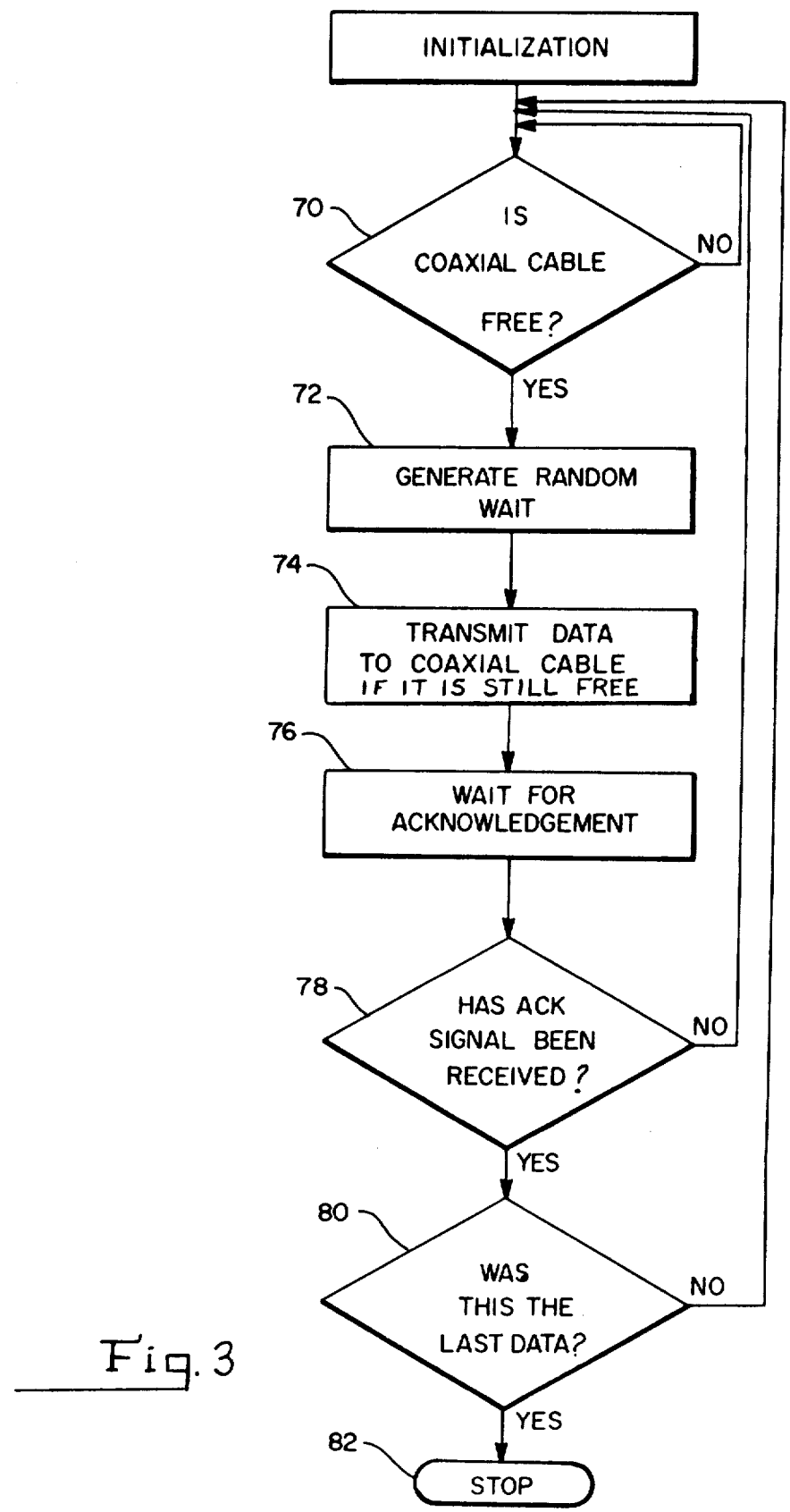
FIG. 3 is a flow chart showing the operation of the present invention.

Referring now to FIG. 3, a flow chart of transmission operations is shown. Because the network of the present invention is not intended to operate near its capacity bandwith, the contention scheme is greatly simplified as compared to other systems. Rather than attempting to detect collisions upon transmission, each transmitter with a data packet queued for transmission monitors the activity on the communications channel, step 70. When a potential transmitter in the system detects activity on the channel, it waits until the end of the existing transmission and introduces a random wait 72 at that point. The random wait routine is performed by the microprocessor of the transmitting device. At the end of the random wait, the transmitter begins transmission of data to the cable or channel if it is not currently carrying data 74 and proceeds to the end of the transmission. In the event of a data collision on the network (i.e., two or more stations 50 are transmitting over the cable 52 simultaneously) no acknowledgement from the intended receiver is received 78 for the transmission that is sent. The affected transmitter waits for a time out period 76. If, during this time out period, no acknowledgement is received, availability of the channel must again be determined 70.

If, however, an acknowledgement signal has been received by the transmitter, the local network interface is free to transmit another packet of data. The system determines whether the last data packet transmitted was the final data to be sent 80. If so, the system ceases operation 82. If more data remains to be transmitted, however, the system again detects whether the communications channel 52 is being used 70 and the transmission sequence is repeated.

From the foregoing discussion, it will be evident to those skilled in the art that a novel network apparatus and method of use thereof is herein disclosed. It will also be appreciated that the description of the preferred embodiment should in no way limit the number of possible system configurations which can be utilized as a result of the teaching of this disclosure.

What is claimed is:

1. A local network interface for interface for connecting a common serial communications medium to a data processing station, said station including at least one station processor, comprising;

(a) communications control means for monitoring and formatting the flow of data to and from said interface;

(b) a buffer memory for storing data upon receipt from said medium and for storing data to be transmitted to said medium;

(c) a direct memory access (DMA) controller operatively connected to said communications control means and said buffer memory for controlling the flow of data between said communications control means and said buffer memory;

(d) a control processor operatively connected to said communications controller means, said DMA controller and said buffer memory for controlling the operation of said interface;

(e) an interprocessor communications means for transferring data between said buffer memory and said data processing station;

(f) whereby to receive data;
(f1) said control processor initializes said communications control means for receipt of data;
(f2) said communications control means signals said control processor upon detection of a message intended for said interface;
(f3) said control processor initializes said DMA controller;
(f4) said message is received and is formatted by said communications control means and transferred to said buffer memory by said DMA controller;
(f5) said control processor signals said station processor and said message is transferred to said data processing station by said interprocessor communications means; and, (g) whereby to transmit data:
(g1) said station processor signals said control processor and a message is transferred to said buffer memory by said interprocessor communications means;
(g2) said DMA controller is initialized by said control processor and said communications control means is initialized by said control processor to transmit data;
(g3) when said medium is free, said message is transmitted from said buffer memory to said communications control means by said DMA controller;
(g4) said data reformatted and transmitted by said communications control means.

2. A local network interface, as described in claim 1, wherein said communications control means further comprises a transmitter state control means operatively connected to said control processor for receiving initialization commands from said control processor and initializing said communications control means to receive or transmit data in accordance with said initialization commands and for controlling said communications control means in accordance with the appropriate communications medium protocol during transmission of data, whereby the processing burden on said contriol processor is reduced during data transmission.

3. A local network interface as described in claim 1 wherein said buffer memory further comprises program storage for said control processor and said interface further comprises bootstrap means operatively connected to said processor for storing an initialization program for said interface, said initialization program being stored so as to survive a power-off conditions, whereby, upon applications of power, program data may be loaded into said program storage from said medium under control of said initialization program.

4. The local network interface in accordance with claim 20 wherein said communications control means further comprises an encoder means for encoding data to be transmitted into a standard format.

5. The local network interface in accordance with claim 2 wherein said communications control means be transmitted is the Manchester code format.

6. The local network interface in accordance with claim 1 wherein said buffer memory is a volatile random access memory (RAM) and refresh circuitry operatively connected thereto for maintaning the data therein.

7. A local network interface described in claim 1 wherein said interprocessor communications means enables said control processor to directly access the memory of said station processor and enables said station processor to diectly access said buffer memory, whereby messages may be transferred between said station processor and said buffer memory for transmission and receipt.

* * * * *